(12) United States Patent
Nakagawa et al.

(10) Patent No.: US 6,223,403 B1
(45) Date of Patent: May 1, 2001

(54) LOCKING DEVICE FOR CHILD SEAT

(75) Inventors: Osamu Nakagawa; Junichi Yoshida, both of Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/390,322

(22) Filed: Sep. 7, 1999

(30) Foreign Application Priority Data

Sep. 9, 1998 (JP) .................................................. 10-255377

(51) Int. Cl.[7] .............................. A44B 11/25; B60R 22/00
(52) U.S. Cl. ........................ 24/633; 24/115 L; 24/134 P; 24/634
(58) Field of Search ............................. 24/633, 647, 634, 24/663, 134 P, 115 L

(56) References Cited

U.S. PATENT DOCUMENTS

| Re. 0,015,290 | * | 2/1922 | Kemper et al. ...................... 24/115 L |
| Re. 0,032,448 | * | 6/1987 | Anderson .............................. 280/808 |
| 1,959,722 | * | 5/1934 | Lackner ............................... 24/134 P |
| 3,146,754 | * | 9/1964 | Ohnsman ............................. 24/134 P |

FOREIGN PATENT DOCUMENTS

| 0094525 | * | 3/1989 | (SU) ..................................... 24/115 L |
| 8901746 | * | 3/1989 | (WO) ...................................... 24/633 |

* cited by examiner

Primary Examiner—Victor N. Sakran
(74) Attorney, Agent, or Firm—Kanesaka & Takeuchi

(57) ABSTRACT

A locking device for a child seat includes slant faces, and a clamping unit having a tiltable clamping roller and a knob for tilting the roller. The slant faces may be formed on a base back of the child seat. A shoulder webbing is inserted between the roller and the slant face, and the clamping roller is tilted so that the webbing is clamped by the roller. The roller is positioned by a spring. The locking device can lock the shoulder webbing when a child seat is mounted either on a left vehicle seat or a right vehicle seat.

6 Claims, 8 Drawing Sheets

LOCKING DEVICE FOR CHILD SEAT

BACKGROUND OF THE INVENTION AND RELATED ART STATEMENT

The present invention relates to a locking device for fixing a child seat to a vehicle seat by a webbing of a seat belt device and, more particularly, to a locking device employing a clamping roller for clamping the webbing of the seat belt device.

For mounting a child seat on a vehicle seat, the child seat is normally fixed by a webbing of a seat belt device for an adult occupant. Disclosed in GB 2288202A is a locking device employing a clamping roller for clamping the webbing. The clamping roller is provided with serrations or projections around the outer periphery thereof which extend parallel to the axis of the roller. A shoulder webbing of the seat belt device can be clamped between the roller and stepped surfaces confronting the roller.

For clamping the shoulder webbing of the seat belt device by the clamping roller, the axial direction of the clamping roller should be substantially perpendicular to the longitudinal direction of the webbing. The shoulder webbing is arranged to extend upwardly diagonally from the right side to the left side or from the left side to the right side along the seat back of the seat. That is, one end of the shoulder belt is connected to a tongue engaging a buckle which is arranged at a middle of a vehicle body, and the other end of the shoulder belt is hooked at an upper portion of a pillar of the vehicle body. Therefore, in case of a left-side seat of the vehicle, the shoulder webbing extends upwardly diagonally from the right side to the left side. On the other hand, in case of a right-side of the vehicle, the shoulder webbing extends upwardly diagonally from the left side to the right side.

In GB 2288202A, two clamping units are used which are a left-side clamping unit for locking the shoulder webbing of the left-side seat, and a right-side clamping unit for locking the shoulder webbing of the right-side seat.

It is an object of the present invention to provide a locking device for a child seat, which can clamp a shoulder belt on either the left-side seat or the right-side seat by means of one clamping roller.

SUMMARY OF THE INVENTION

A locking device for a child seat of the present invention is designed for securing a child seat on a vehicle seat by means of a webbing of a vehicle seat belt device. The locking device comprises a clamping roller for clamping the webbing, and presser faces for cooperating with the clamping roller to clamp the webbing. The clamping roller is disposed so that its axis extends in the vertical direction, and is capable of being tilted between a right tilt position where it is tilted toward the right of the child seat and a left tilt position where it is tilted toward the left of the child seat. The presser faces include a first presser face which confronts the clamping roller when the clamping roller is in the right tilt position, and a second presser face which confronts the clamping roller when the clamping roller is in the left tilt position.

In the locking device of the present invention, the clamping roller can be tilted toward the right or left of the child seat, so that only one clamping roller can clamp both shoulder webbings on the right and left vehicle seats.

It is preferable that the locking device further comprises a knob for tilting the clamping roller in either tilt position.

The locking device may comprise positioning means for holding the clamping roller at either the left tilt position, the right tilt position, or a neutral position where the clamping roller is set.

According to the present invention, the locking device may comprise a clamp base on which a spring, as the positioning means, is provided. The presser faces may be provided in a concave portion formed in a base back of the child seat, and the clamp base may be installed to the base back to face the concave portion.

BRIEF DESCRIPTION OF THE DRAWINGS

FIG. 4($b$) is a sectional view taken along a line 4$b$—4$b$ of FIG. 4($a$);

DETAILED DESCRIPTION OF A PREFERRED EMBODIMENT

Hereinafter, an embodiment of the present invention will be described with reference to FIGS. 1 through 9.

Figure 9:
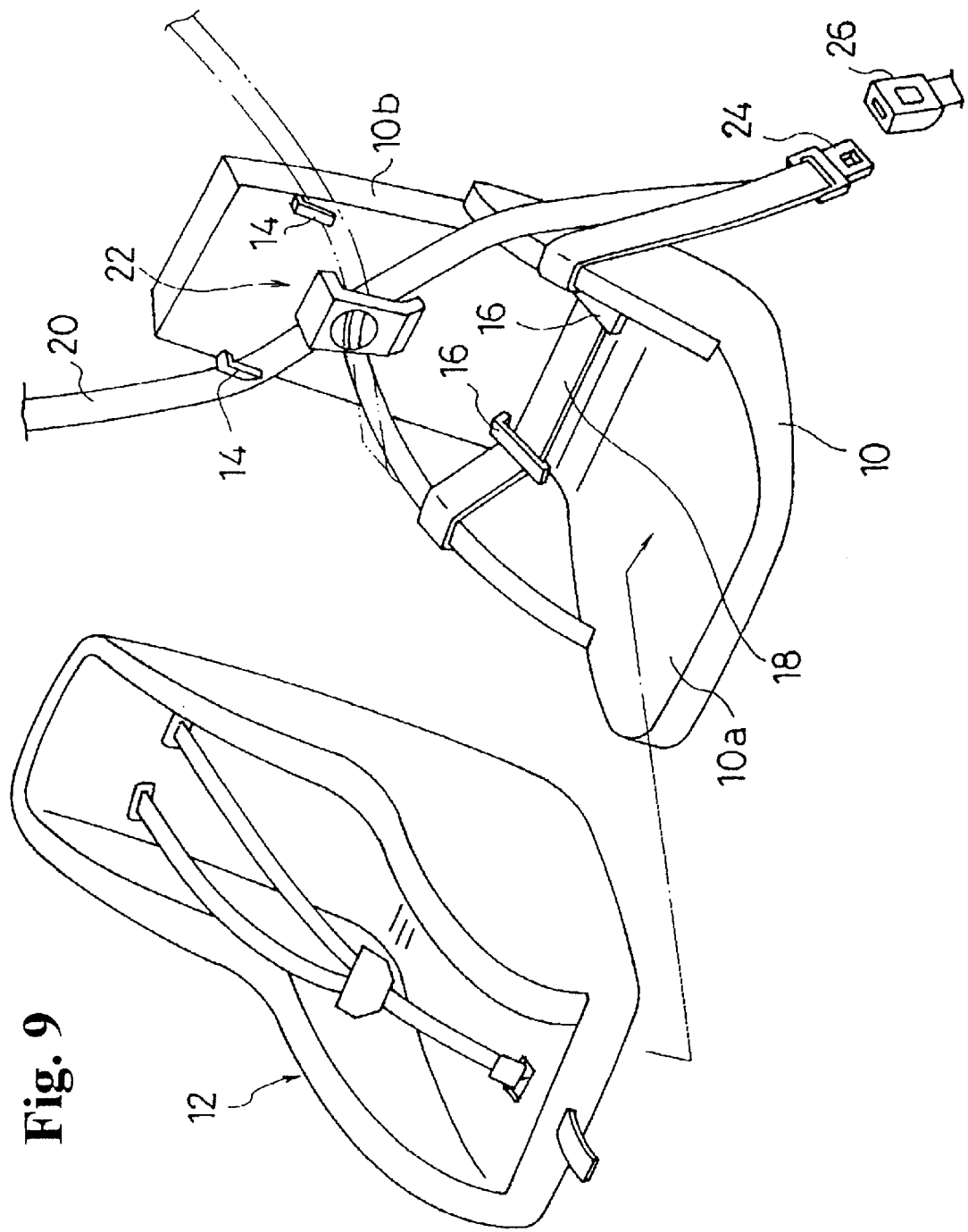
FIG. 9 is a perspective view of a child seat having the locking device according to the embodiment.

As shown in FIG. 9, a child seat provided with a locking device according to this embodiment comprises a child seat base 10 and a seat body 12 assembled to the child seat base 10. The child seat base 10 comprises a base bottom 10$a$ and a base back 10$b$ standing from the base bottom 10$a$. The child seat is provided with a clamping unit 22 for clamping a shoulder webbing 20 of a seat belt device which is disposed about the middle in both the height direction and the width direction of the base back 10$b$. Disposed at the left and right ends of the base back 10$b$ are hooks 14 on which the shoulder webbing 20 is hooked. Disposed on a lower portion of the base back 10$b$ are hooks 16 on which a lap webbing 18 is hooked.

The seat belt device comprises a retractor (not shown) for winding up the shoulder webbing 20. The shoulder webbing 20 is hooked on a deflection fitting fixed to a B pillar and the like of the vehicle. The webbings 18, 20 are made of a single webbing which is inserted into an opening of a tongue 24 and is folded at the position of the tongue 24 to define the webbings 18, 20. The tongue 24 is engaged with a buckle 26 of the seat belt device.

Figure 1:
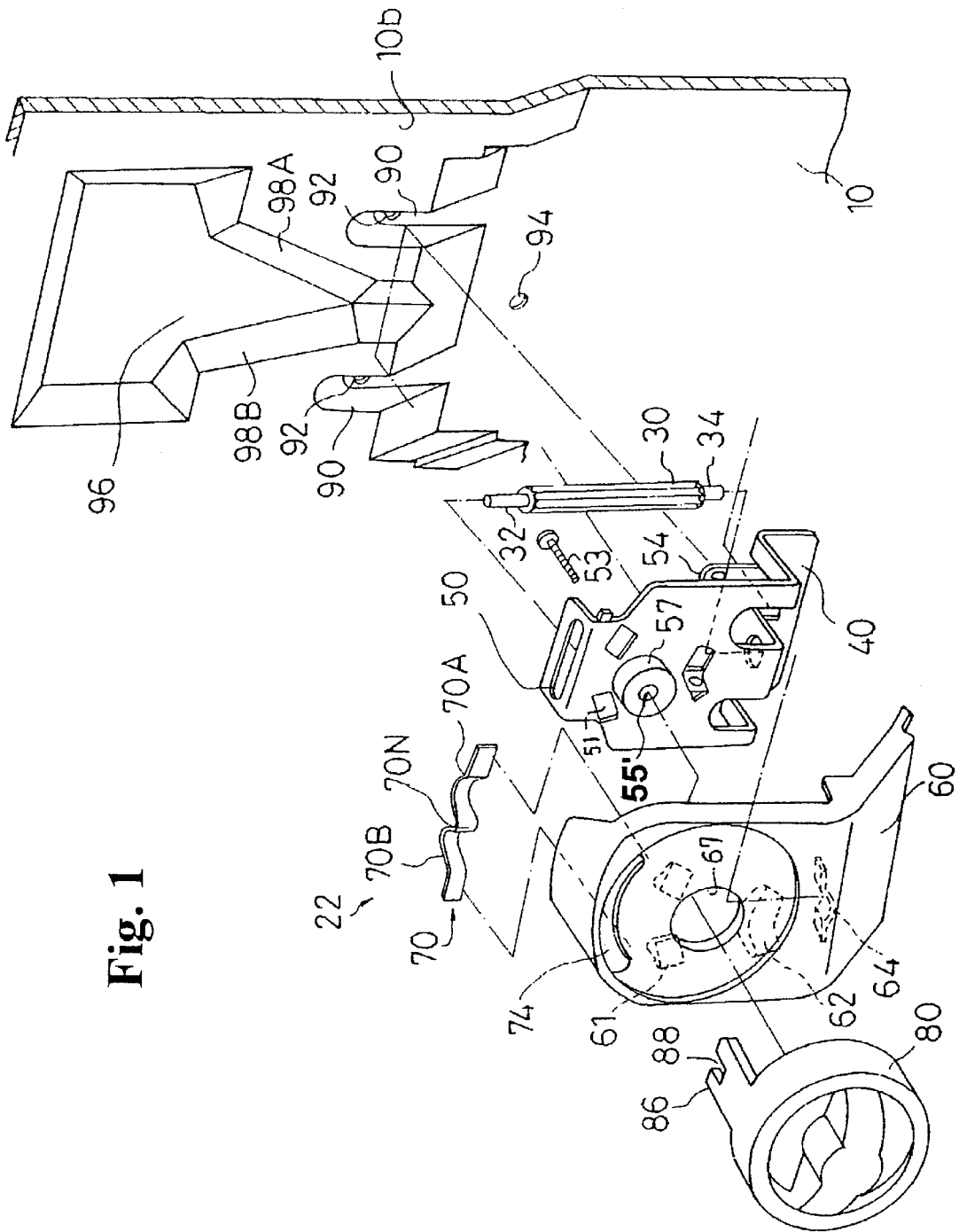
FIG. 1 is an exploded perspective view of a locking device according to an embodiment of the invention.

Now, the structure of the clamping unit 22 will be described in detail. As shown in FIG. 1, the clamping unit 22 comprises a clamping roller 30, a clamp base 40 supporting the clamping roller 30, a cover 60 for covering the clamp base 40, and a knob 80 for tilting the clamping roller 30. The clamping roller 30 is assembled to the clamp base 40 in such a manner that its axial direction extends vertically. The clamping roller 30 is provided with an upper shaft 32 and a lower shaft 34 projecting from the upper end and the lower end of the clamping roller 30, respectively. The roller 30 is provided with serrations or projections around the outer periphery thereof which extend parallel to the axis of the roller. The serrations may be formed in a crisscross pattern.

Figure 2:
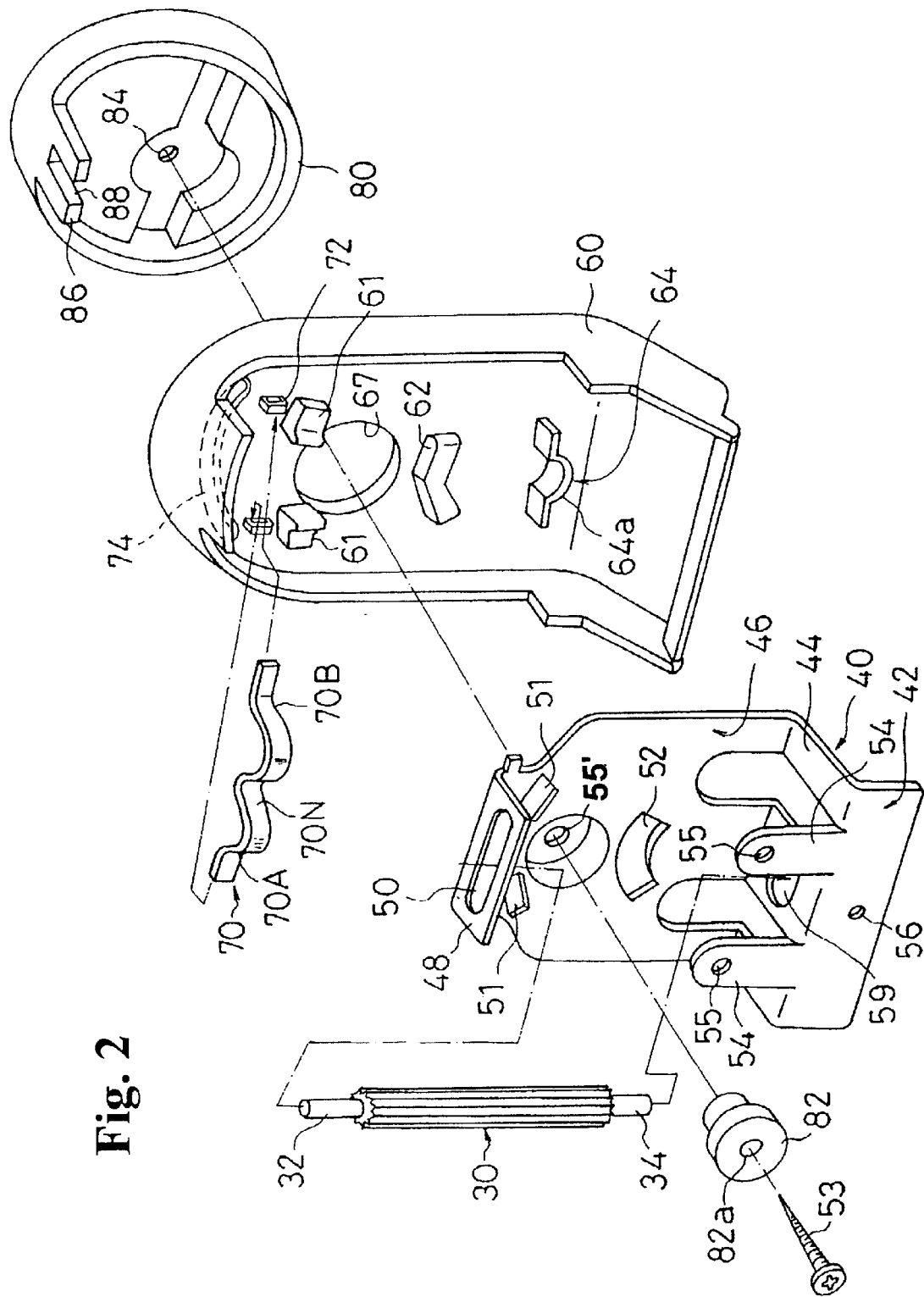
FIG. 2 is an exploded perspective view of a clamping unit, taken from a side opposite to that shown in FIG. 1.
Figure 3:
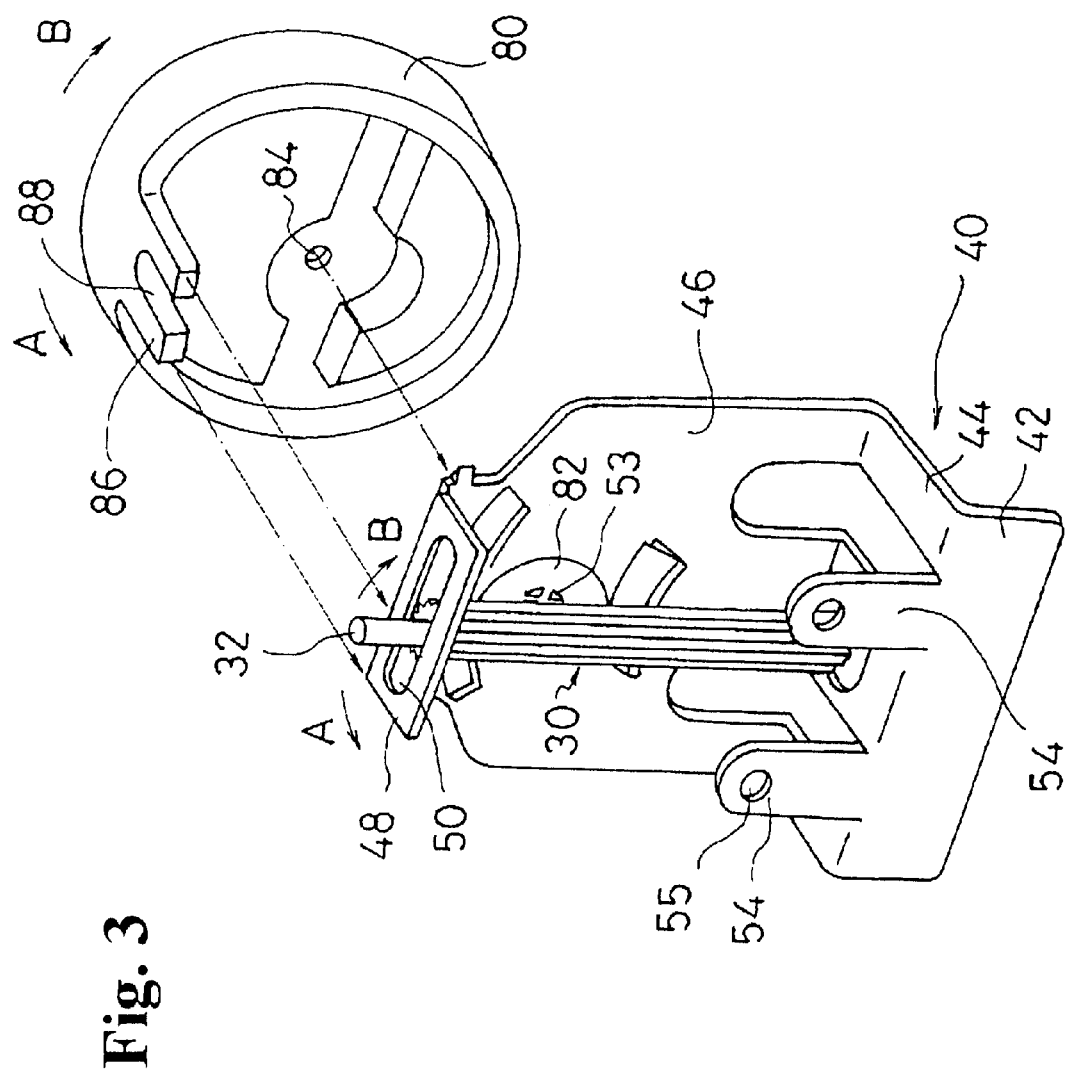
FIG. 3 is an exploded perspective view for showing a relation among a clamp base, a roller and a knob.
Figure 4A:
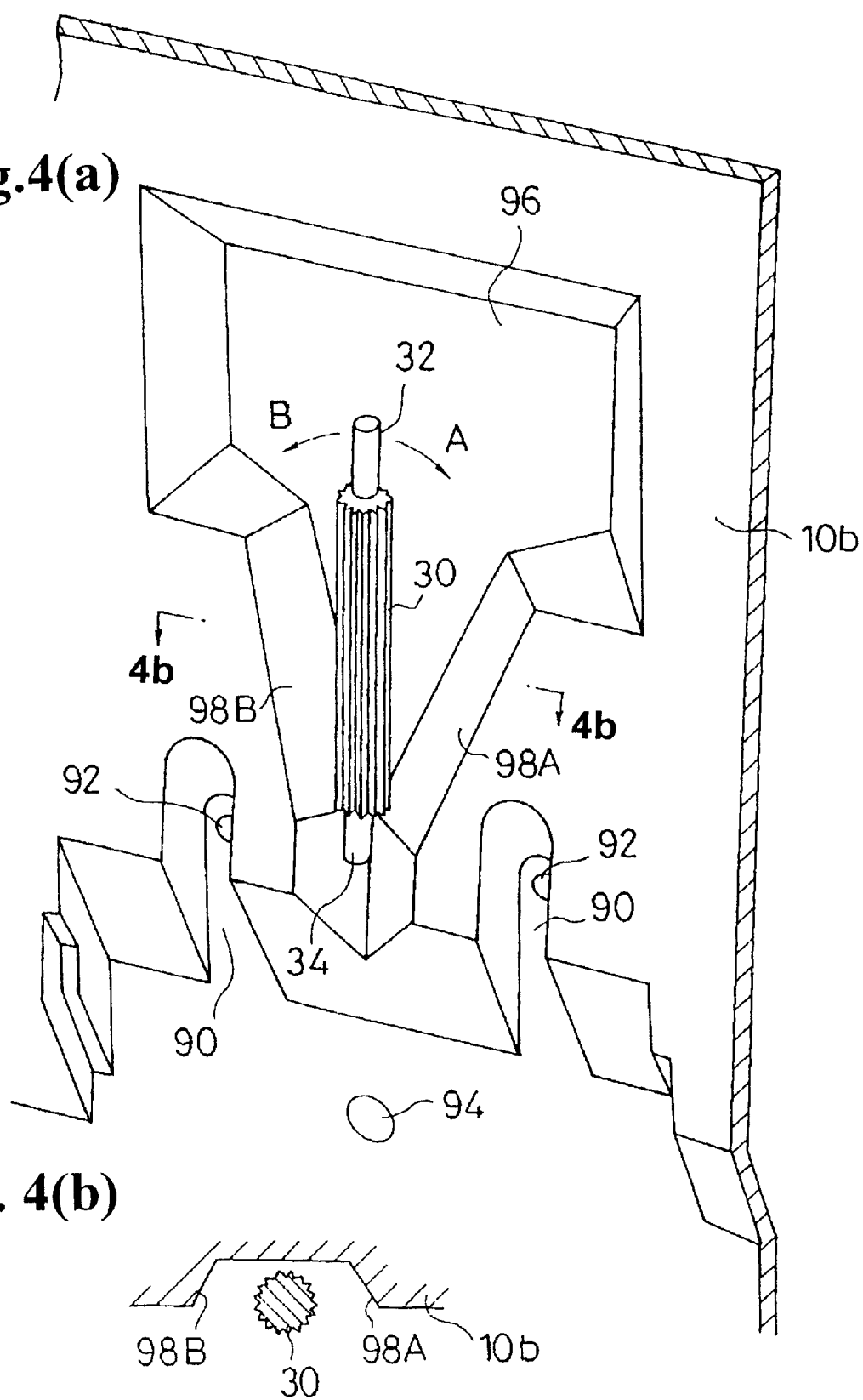
FIG. 4($a$) is a perspective view illustrating a relation between the roller and slant faces when the roller is in the neutral position.
Figure 4B:
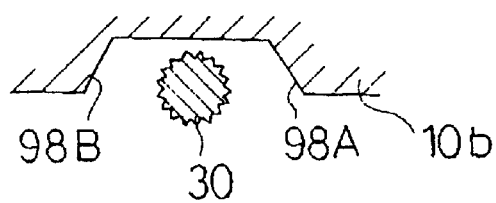

As clearly shown in FIG. 2, the clamp base 40 comprises a lower vertical plate 42, an upper vertical plate 46, a connecting plate 44 connecting the vertical plates 42, 46, and an overhanging portion 48 overhanging from the upper end of the upper vertical plate 46. Formed in the overhanging portion 48 is a through hole 50 for the upper shaft 32. The through hole 50 is an elongated hole extending in the width direction of the clamp base 40. Formed in the connecting plate 44 is a through hole 59 for the lower shaft 34.

Formed in the upper vertical plate 46 are openings 51, 52 into which projections of the cover 60 as described later are fitted, and a hole 55' into which a screw 53 is inserted. Projecting pieces 54 are formed on the upper end of the lower vertical plate 42 to be flush with the lower vertical plate 42. Formed in each projecting piece 54 is a screw through hole 55. The lower vertical plate 42 also has a screw through hole 56.

The upper vertical plate 46 has a cylindrical protrusion 57 (see FIG. 1) coaxial with the aforementioned screw through hole 55'.

The cover 60 has an opening 67 for receiving the protrusion 57. The cover 60 also has projections 61, 62 formed near the opening 67, which enter into the openings 51, 52 of the clamp base 40.

The cover 60 is provided with a roller receiver 64 to be positioned beneath the connecting plate 44 of the clamp base 40. The roller receiver 64 has a U-like curved bearing portion 64a where the lower shaft 34 of the roller 30 is supported.

The cover 60 has spring supporting holes 72 for supporting a spring 70 which positions the roller 30. Further, formed in the cover 60 at a position above the spring supporting holes 72 is a lever through hole 74 extending in an arc-like shape in the width direction of the cover 60.

The knob 80 is disposed to be superposed on the cover 60 and is supported rotatably by a slip cap 82 and the screw 53. The screw 53 passes through a central hole 82a of the slip cap 82 and is then screwed into a screw hole 84 of the knob 80. The slip cap 82 is fitted inside the protrusion 57.

A lever 86 is formed to project from an upper portion of the knob 80 and has a cutout 88 formed at one end thereof, which is engageable with the upper shaft 32. That is, the lever 86 is inserted into a lever through hole 74 of the cover 60 to overhang above the overhanging portion 48 of the clamp base 40. Then, the cutout 88 is engaged with the upper shaft 32 so that the roller 30 is tilted right or left by the turning of the knob 80.

The spring 70 comprises a middle portion 70N engaging the upper shaft 32, and the right and left biasing portions 70A, 70B. When the axial direction of the roller 30 is vertical, the upper shaft 32 is engaged with the middle portion 70N. When the roller 30 is tilted by turning the knob 80, the roller 30 is tilted while deflecting the spring 70, so that the upper shaft 32 is engaged with the biasing portion 70A or 70B so as to be kept in the tilt state.

The clamping unit 22 is installed to the base back 10b of the child seat base 10 as mentioned above. This installation is done by inserting the screws into the screw through holes 55, 56, respectively, and screwing the screws into the base back 10b.

As shown in FIG. 1, the base back 10b is provided with grooves 90 into which the projecting pieces 54 of the clamp base 40 enter. Formed in the inside of the grooves 90 are screw holes 92. The base back 10b has another screw hole 94 below the middle between the grooves 90, 90.

Also formed in the base back 10b is a concave portion 96 for receiving the roller 30 of the clamping unit 22, which is fixed to the base back 10b, and slant faces 98A, 98B to correspond the roller 30 which is tilted right or left. The slant faces 98A, 98B together form a V-like shape to have the longest distance therebetween at the uppermost. The slant faces 98A, 98B and the clamping unit 22 compose a locking device.

The child seat having the locking device structured as mentioned above is put on a vehicle seat and fixed by the webbings of the seat belt device.

Figure 7:
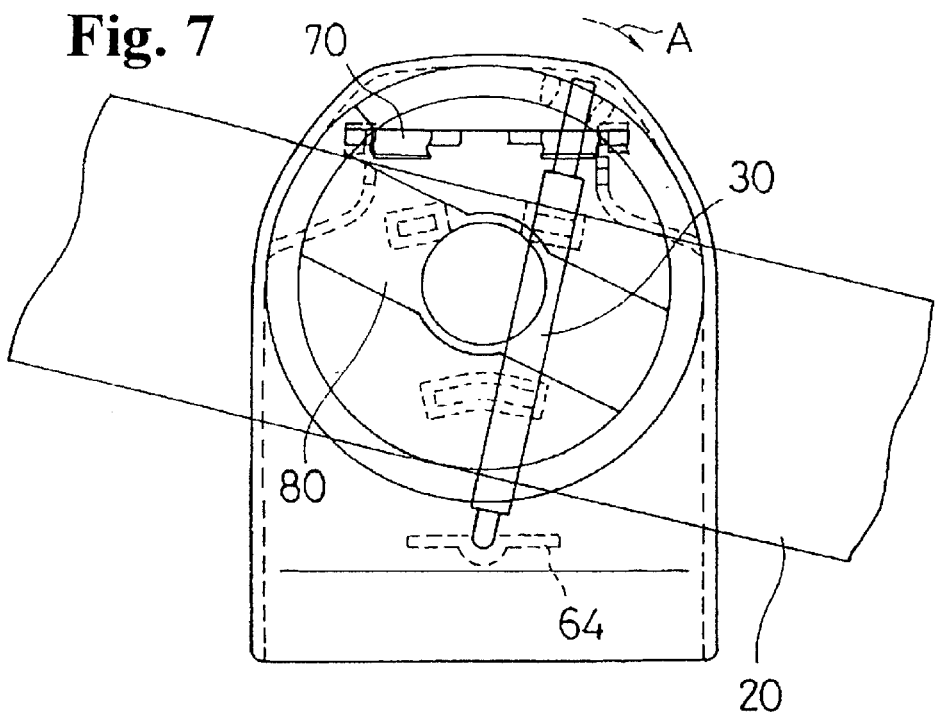
FIG. 7 is a schematic front view of the clamping unit when the roller is tilted in the direction of the arrow A.

As shown FIG. 9, for fixing the child seat, the shoulder webbing 20 is hooked on the upper hook 14, the lap webbing 18 is hooked on the lower hooks 16, and the tongue 24 is latched to the buckle 26. The shoulder webbing 20 is inserted between the base back 10b and the clamp base 40 with the roller 30. In case the child seat is mounted on the right-side vehicle seat, the knob 80 is turned in the direction of the arrow A as shown in FIGS. 5, 7.

Thus, the roller 30 is tilted in the direction of the arrow A, so that the shoulder webbing 20 is clamped between the right-side slant face 98A and the roller 30. In this case, when the webbing 20 is pulled by the retractor in the direction of an arrow R of FIG. 5, a force is exerted on the roller 30 from the webbing 20 in the direction of separating the roller 30 from the slant face 98A, so that the webbing 20 passes between the roller 30 and the slant face 98A and is thus wound up by the retractor. This removes the looseness of the webbing.

Figure 5:
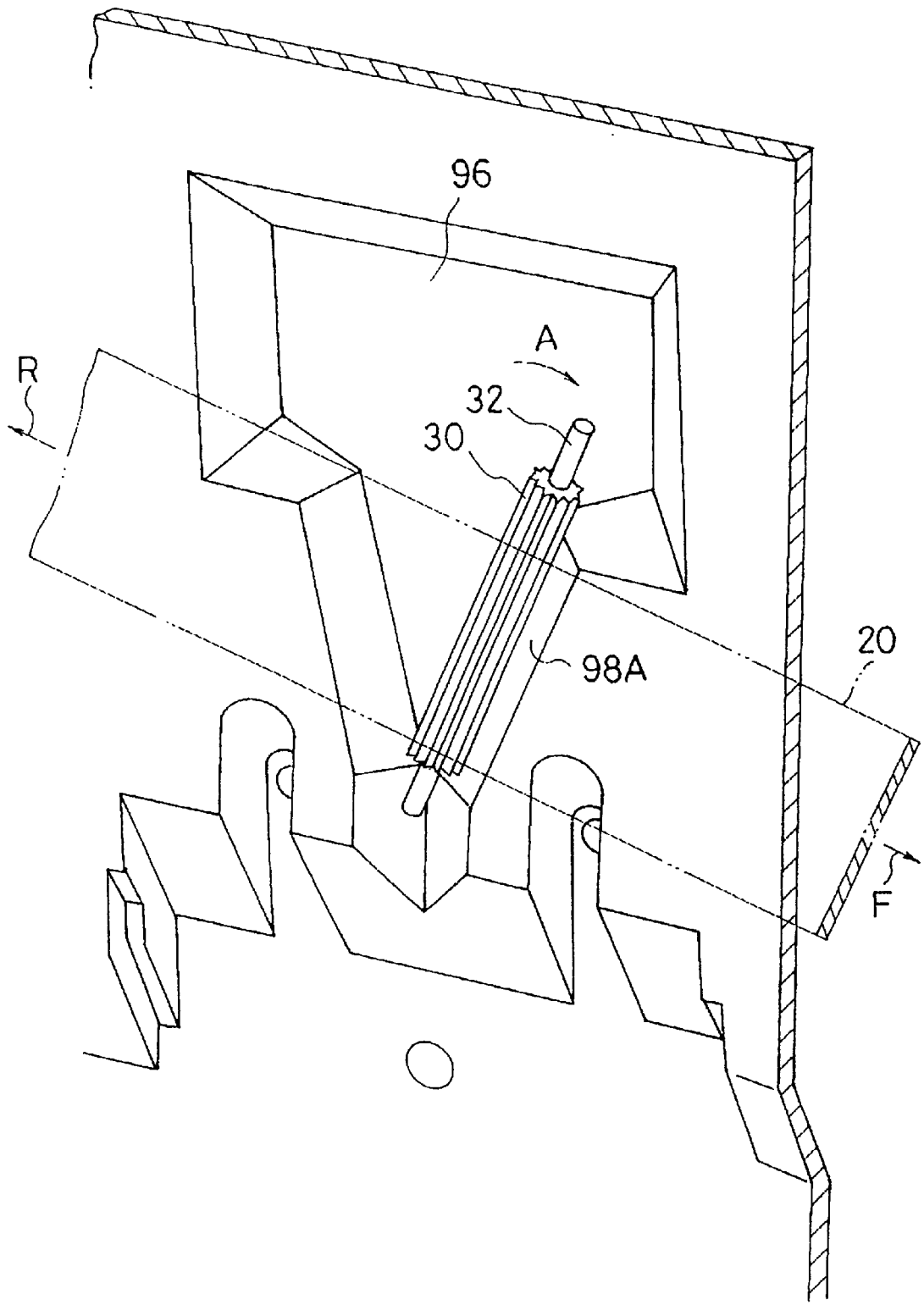
FIG. 5 is a perspective view illustrating a relation between the roller and one slant face when the roller is tilted in a direction of an arrow A.

When the webbing is pulled in the direction of an arrow F of FIG. 5, a force is exerted on the roller 30 in the direction of the arrow A because of the friction between the webbing 20 and the outer surface of the roller 30, so that the webbing 20 is strongly clamped between the roller 30 and the slant face 98A to prevent the webbing 20 from moving in the direction of the arrow F. As a result of this, the webbing 20 between the roller 30 and the tongue 24 is tightened and the lap webbing 18 is also tightened, thus securing the child seat to the vehicle seat.

Figure 6:
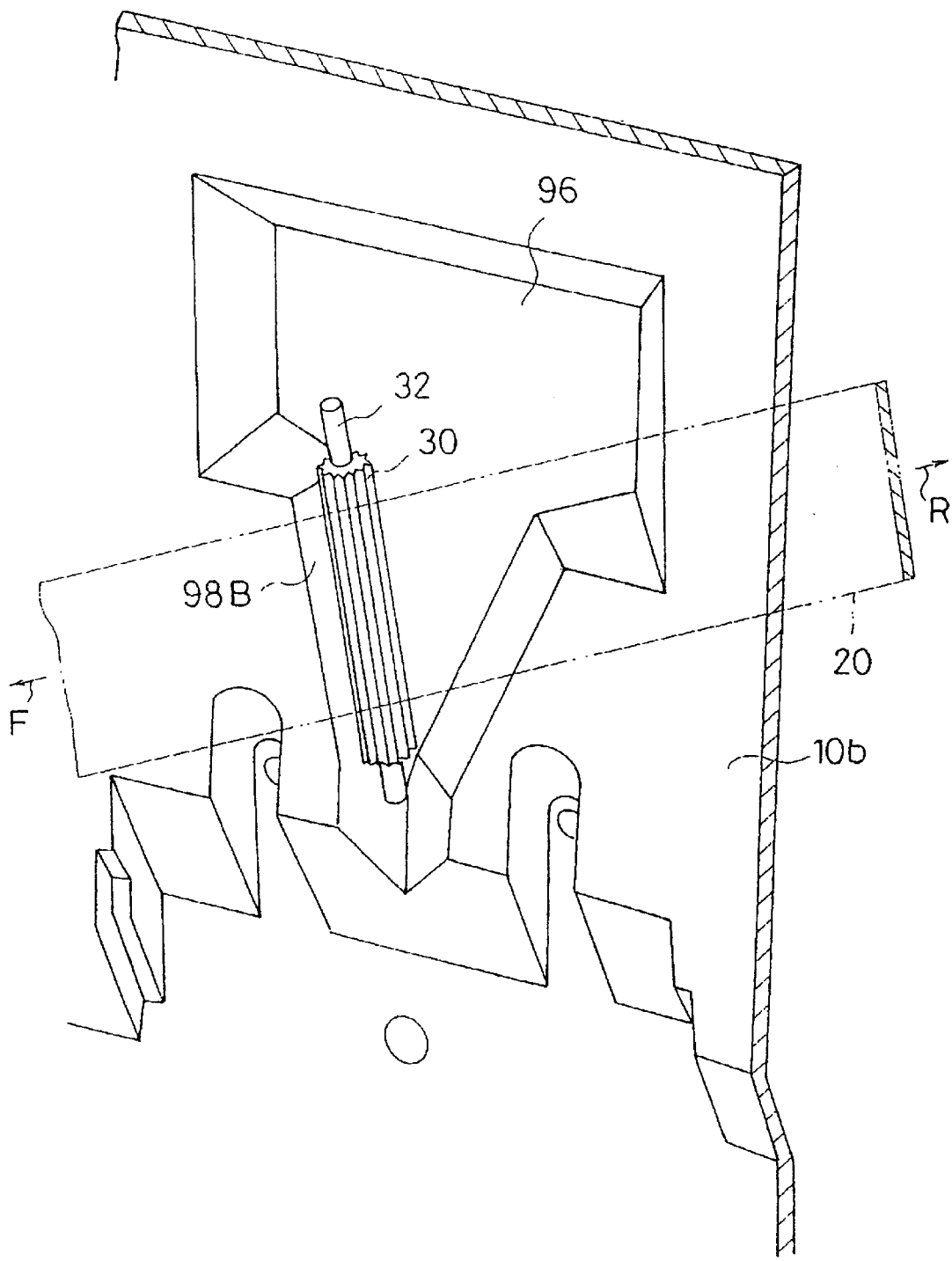
FIG. 6 is a perspective view illustrating a relation between the roller and the other slant face when the roller is tilted in a direction of an arrow B.
Figure 8:
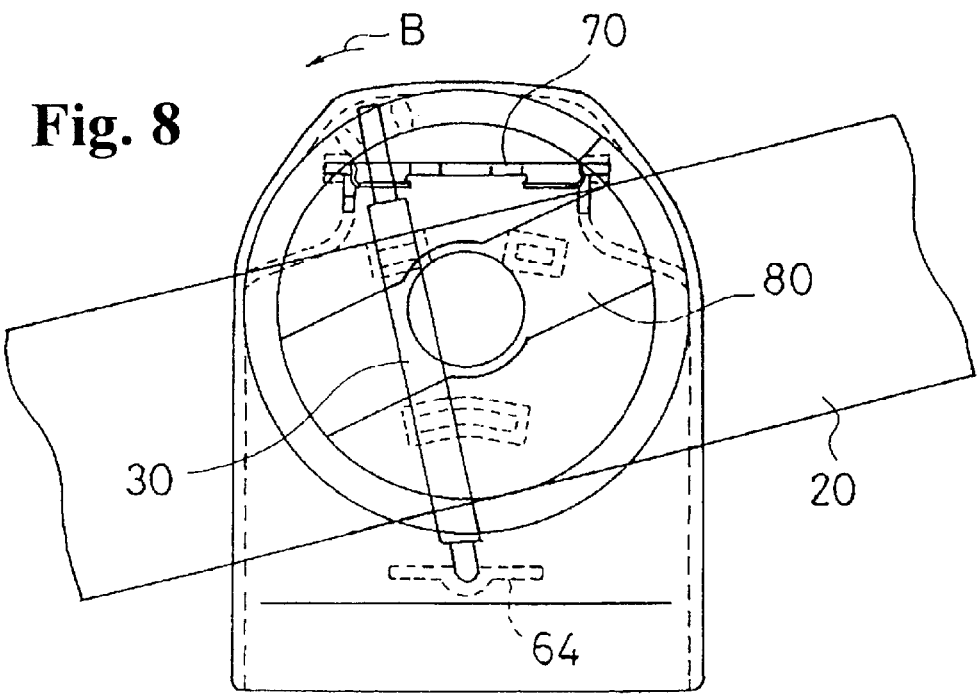
FIG. 8 is a schematic front view of the clamping unit when the roller is tilted in the direction of the arrow B.

In case the child seat is mounted on the left-side vehicle seat, the shoulder webbing 20 extends as shown by two-dot chain lines of FIG. 9. In this case, the knob 80 is turned in the direction of the arrow B. Then, the webbing 20 is clamped between the roller 30 and the slant face 98B as shown in FIGS. 6 and 8. Also in this case, the webbing 20 passes between the roller 30 and the slant face 98B so to be wound up by the retractor when it is pulled in the direction of the arrow R, and the webbing 20 is strongly clamped between the roller 30 and the slant face 98B so as to be prevented from passing between the roller 30 and the slant face 98B when it is pulled in the direction of the arrow F.

When the child seat is mounted on either the left vehicle seat or the right vehicle seat, the shoulder webbing 20 can be strongly clamped by means of this locking device as mentioned above just by turning the knob 80 left or right, thereby securing the child seat to the vehicle seat.

As described above, when the child seat is mounted on the left vehicle seat or the right vehicle seat, the shoulder webbing can be strongly clamped by means of the locking device having only one clamping unit, thereby securing the child seat to the vehicle seat. Since the locking device needs only one clamping unit, the cost of the device is reduced.

While the invention has been explained with reference to the specific embodiment of the invention, the explanation is illustrative and the invention is limited only by the appended claims.

What is claimed is:

1. A locking device for securing a child seat on a vehicle seat by means of a webbing of a vehicle seat belt device, comprising:

a clamping roller for clamping the webbing, said clamping roller having an axis extending in a vertical direction to be tiltable between a right tilt position where it is tilted toward a right of the child seat and a left tilt position where it is tilted toward a left of the child seat, and presser faces situated near the clamping roller for cooperating with said clamping roller to clamp the webbing, said presser faces having a first presser face confronting the clamping roller when the clamping roller is in the right tilt position, and a second presser face confronting the clamping roller when the clamping roller is in the left tilt position.

2. A locking device as claimed in claim 1, further comprising a knob connected to the clamping roller for tilting the clamping roller between the right and left tilt positions.

3. A locking device as claimed in claim 2, further comprising positioning means for holding the clamping roller at one of the left tilt position, the right tilt position, and a neutral position where the clamping roller is set.

4. A locking device as claimed in claim 3, further comprising a clamp base, and said positioning means is a spring, said spring being provided on the clamp base.

5. A locking device as claimed in claim 4, wherein said presser faces are provided in a concave portion formed in a base back of the child seat, and said clamp base is fixed to the base back to face the concave portion.

6. A locking device as claimed in claim 1, further comprising a back section having said presser faces therein, and a clamp base fixed to the back section, said clamp base having a lower supporting portion for supporting a lower portion of the clamping roller and an upper supporting portion for supporting an upper portion of the clamping roller, said upper portion being tiltable between the right and left tilt positions while the lower portion supporting the clamping roller as a center of a tilting movement.

* * * * *